P. A. MAHONEY.
REGULATING RELIEF FAUCET.
APPLICATION FILED APR. 5, 1918.

1,290,271. Patented Jan. 7, 1919.

INVENTOR
Patrick A. Mahoney
by Eginbetroice
attorney

UNITED STATES PATENT OFFICE.

PATRICK A. MAHONEY, OF PORTLAND, MAINE.

REGULATING RELIEF-FAUCET.

1,290,271.  Specification of Letters Patent.  Patented Jan. 7, 1919.

Application filed April 5, 1918. Serial No. 226,793.

*To all whom it may concern:*

Be it known that I, PATRICK A. MAHONEY, a citizen of the United States, residing at Portland, in the county of Cumberland and State of Maine, have invented certain new and useful Improvements in Regulating Relief-Faucets, of which the following is a specification.

This invention relates to improvements in regulating relief faucets. It is specially designed to be used in faucets used in hot water system and in faucets which are opened and closed manually as by means of a threaded stem, but any faucet in which the valve is opened and closed by positive acting mechanism is within the spirit and scope of the invention. It is designed to provide a simple and inexpensive structure which can be conveniently regulated to permit the faucet to open automatically when the pressure in the system reaches a given degree.

It is well known in the plumbing art that relief valves, when held seated for a long time, are apt to adhere to the seat so that the valve will not be raised when the pressure reaches the degree set for it to open and danger may ensue. It is one of the objects of this invention to provide means whereby the valve is raised from its seat every time the faucet is used which renders it free from the objection above noted.

Figure 1:
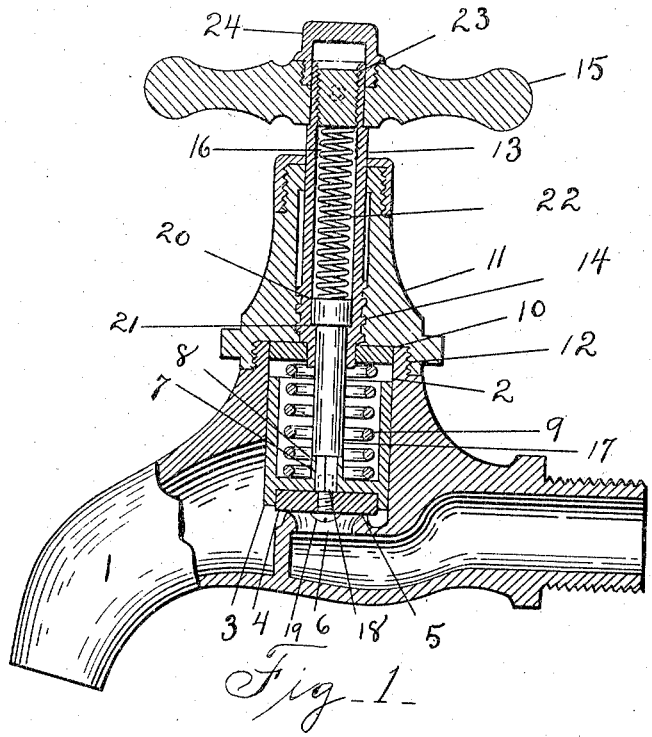
Figure 2:
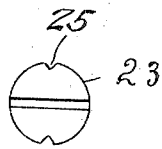

In the drawings herewith accompanying and making a part of this application Figure 1 is a vertical sectional view partly in elevation of my safety faucet, and Fig. 2 is a plan view of the safety spring adjusting nut.

The same reference characters indicate like parts in the several figures.

In the embodiment of my invention shown in said drawings 1 is a casing of a faucet adapted to be used in a pressure system. In the top of the casing is an opening 2. In said opening and vertically movable therein is a valve 3 which may, if desired, be chambered as shown in the drawings. On the bottom is a packing 4 which rests on valve seat 5 in the casing and closes the service opening 6 in the faucet. The valve has an angular hole 7 which may be surrounded by a boss 8 formed integral with the valve. A compression spring 9 interposed between the valve and a washer 10 tends to hold the valve down upon its seat. The casing is provided with a cap 11 having threaded engagement therewith, as seen at 12. A stem 13 is mounted in said cap in threaded engagement therewith, as seen at 14, and carries at the top an operating handle 15. The stem is made in two parts, the top being chambered, as seen at 16. In said chambered part is a vertically reciprocating part 17, having on its lower end an angular projection 18 adapted to fit into the angular hole in the valve and to be secured to the valve in any convenient manner as by a screw 19, whereby the raising of the stem either positively by said handle or the part 17 automatically, when the pressure reaches a certain degree, lifts the valve from its seat. The upper end of the reciprocating part 17 has a lug 20 adapted to rest upon a shoulder 21 in the chambered part of the stem. In the chamber in the stem is a coil spring 22 tending to force the reciprocating part down which may be adjusted to any desired tension by means of a threaded adjusting screw 23. Notches 25 in the side of the adjusting screw 23 are provided to receive a locking pin, not shown, by means of which the adjusting screw can be locked in any given position. The handle is provided with a chambered cap 24 into which said threaded screw projects. The screw is designed to be even with the top of the handle when the pressure on the spring is just sufficient to resist the opening of the valve, which may be increased by turning the screw down or lessened by turning the screw up relative to said normal position. This affords a convenient device for indicating the extent of adjustment.

The operation of my device is as follows:

Assume the device to be in the position shown in Fig. 1. To open the valve the handle is turned and to close the valve the handle is turned in the opposite direction which carries the valve stem down until the spring seats the valve. Spring 9 has a constant tension, say fifty pounds, and has to be overcome every time the valve is raised from its seat. If now it is desired to increase the pressure required before the valve will open, the spring in the stem is compressed by turning down the screw in the chamber of the stem until the pressure necessary to raise the valve from its seat reaches the predetermined degree. It is thus noted that the operation of the faucet in service is manual and that the operation as a relief valve is easily regulated to any required degree and operates automatically.

I claim:

1. In a regulating relief faucet, a valve casing, a valve, a valve stem comprising two parts, one having threaded engagement with a stationary part of the device and the other loosely connected to the threaded part, and two independently operating springs each adapted to hold the loosely connected part under yielding tension.

2. In a regulating relief faucet, a valve casing, a valve, a valve stem comprising two parts, one having threaded engagement with a stationary part of the device and the other loosely connected to said threaded part, two coöperating springs each adapted to hold the latter part under yielding tension and means for regulating the tension of one of said springs.

3. In a regulating relief faucet, a valve casing, a valve, a valve stem comprising two parts, one chambered and having threaded engagement with a stationary part of the device and the other adapted to reciprocate in said chambered part, a spring in said chambered part adapted to hold said last mentioned part under yielding tension and a second spring located outside said chambered part and coöperating with said first mentioned spring.

4. In a regulating relief faucet, a valve casing, a chambered valve, a valve stem comprising two parts, one chambered and having threaded engagement with a stationary part of the device and the other having its lower end attached to said valve and its upper end loosely mounted in said chambered stem, means for holding the valve seated under a positively defined and yielding pressure, a spring in said chambered stem for holding the valve under a yielding tension operating independently of said first mentioned holding means, and means for regulating the tension of said spring.

5. In a regulating relief faucet, a valve casing, a valve, a valve stem comprising two parts, one having threaded connection with a stationary part of the device and the other loosely connected to said first mentioned part and connected to said valve, means for holding said valve seated under a constant yielding pressure, means for holding said valve seated under a further yielding pressure and means for regulating the pressure of said last mentioned holding means.

6. In a regulating relief faucet, a valve casing, a chambered valve, guided by the valve casing, a valve stem comprising two parts, one chambered and having threaded engagement with the casing, the other adapted to reciprocate in said chambered part of said stem, a spring in said chambered part of the stem, and a spring in said chambered part of the valve, the two springs coöperating to hold the valve seated under yielding tension.

In testimony whereof I affix my signature.

PATRICK A. MAHONEY.

Copies of this patent may be obtained for five cents each, by addressing the "Commissioner of Patents, Washington, D. C."